US006747674B1

(12) United States Patent
Asami (10) Patent No.: US 6,747,674 B1
(45) Date of Patent: Jun. 8, 2004

(54) IMAGE PROCESSING APPARATUS, IMAGE PROCESSING METHOD, AND INFORMATION PROVIDING MEDIUM

(75) Inventor: Akiko Asami, Shizuoka (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/432,345

(22) Filed: Nov. 2, 1999

(30) Foreign Application Priority Data

Nov. 6, 1998 (JP) ........................................ P10-315646

(51) Int. Cl.[7] ................................................ G09G 5/00
(52) U.S. Cl. .......................... 345/721; 345/723; 345/725
(58) Field of Search ................................. 345/721, 725, 345/723

(56) References Cited

U.S. PATENT DOCUMENTS

| | | | | |
|---|---|---|---|---|
| 5,495,342 A | * | 2/1996 | Harigaya et al. | 386/121 |
| 5,513,306 A | | 4/1996 | Mills et al. | 395/148 |
| 6,052,492 A | * | 4/2000 | Bruckhaus | 382/284 |
| 6,222,532 B1 | * | 4/2001 | Ceccarelli | 345/723 |
| 6,307,550 B1 | * | 10/2001 | Chen et al. | 345/418 |
| 6,331,859 B1 | * | 12/2001 | Crinon | 345/619 |
| 6,567,980 B1 | * | 5/2003 | Jain et al. | 725/61 |

FOREIGN PATENT DOCUMENTS

| | | | |
|---|---|---|---|
| EP | 0 619 550 A2 | 10/1994 | |
| EP | 0 782 085 A1 | 7/1997 | ........... G06F/17/30 |
| EP | 0 915 471 A2 | 5/1999 | ........... G11B/27/28 |
| WO | WO 98/34182 | 8/1998 | ........... G06F/17/30 |

OTHER PUBLICATIONS

Zhang et al., "Content–Based Video Browsing Tools," Proceedings of the SPIE, vol. 2417, 1995, pp. 389–398.

* cited by examiner

*Primary Examiner*—Ba Huynh
*Assistant Examiner*—Dennis Bonshock
(74) *Attorney, Agent, or Firm*—Oblon, Spivak, McClelland, Maier & Neustadt, P.C.

(57) ABSTRACT

An information processing apparatus, an information processing method, and an information providing medium that allow a user to check the still pictures of a moving picture to be searched at desired points of time and desired time intervals and in a desired quantity. The user operates a mouse or a keyboard to enter a time and a time interval at which a picture is displayed. On the basis of these time and time interval, the CPU generates picture thumbnails of the moving picture. Then, the CPU simultaneously displays the generated picture thumbnails as arranged in a time sequential manner.

6 Claims, 13 Drawing Sheets

| | | | | | |
|---|---|---|---|---|---|
| WORLD NEWS | PICTURE OF 00:00 | PICTURE OF 05:00 | PICTURE OF 10:00 | PICTURE OF 15:00 | PICTURE OF 20:00 |
| ECONOMIC NEWS | PICTURE OF 00:00 | PICTURE OF 10:00 | PICTURE OF 20:00 | PICTURE OF 30:00 | PICTURE OF 40:00 |
| POLITICAL NEWS | PICTURE OF 00:00 | PICTURE OF 01:00 | PICTURE OF 02:00 | PICTURE OF 03:00 | PICTURE OF 04:00 |
| ANIMATION | PICTURE OF 00:00 | PICTURE OF 03:00 | PICTURE OF 06:00 | PICTURE OF 09:00 | PICTURE OF 12:00 |
| MOVIE | PICTURE OF 00:00 | PICTURE OF 20:00 | PICTURE OF 40:00 | PICTURE OF 60:00 | PICTURE OF 80:00 |
| SPORTS | PICTURE OF 00:00 | PICTURE OF 15:00 | PICTURE OF 30:00 | PICTURE OF 45:00 | PICTURE OF 60:00 |

F I G. 5

| PICTURE OF 00:00 | PICTURE OF 01:00 | PICTURE OF 02:00 | PICTURE OF 03:00 | PICTURE OF 04:00 |
| --- | --- | --- | --- | --- |
| PICTURE OF 05:00 | PICTURE OF 06:00 | PICTURE OF 07:00 | PICTURE OF 08:00 | PICTURE OF 08:05 |
| PICTURE OF 08:10 | PICTURE OF 08:15 | PICTURE OF 08:20 | PICTURE OF 08:25 | PICTURE OF 08:30 |
| PICTURE OF 08:35 | PICTURE OF 08:40 | PICTURE OF 08:45 | PICTURE OF 08:50 | PICTURE OF 08:55 |
| PICTURE OF 09:00 | PICTURE OF 10:00 | PICTURE OF 11:00 | PICTURE OF 12:00 | PICTURE OF 13:00 |
| PICTURE OF 14:00 | | | | |

IMAGE PROCESSING APPARATUS, IMAGE PROCESSING METHOD, AND INFORMATION PROVIDING MEDIUM

BACKGROUND OF THE INVENTION

1. Field of the Invention

The present invention relates generally to an image processing apparatus, an image processing method, and an information providing medium and, more particularly, to an image processing apparatus, an image processing method, and an information providing medium that search moving pictures and process the obtained moving pictures.

2. Description of Related Art

With a video tape recorder for example, popularly known methods for searching scenes to be viewed or edited from a moving picture that takes long for reproduction include still, slow, queue, review, and other variable-speed reproduction techniques. Movie advertisements for example frequently use a technique of cutting out very short portions of a moving picture and connecting the cutouts to summarize the content of the original moving picture.

For another searching method, video-on-demand uses a method of using a plurality of channels, which are switched between for reproducing and displaying a moving picture from a desired position at constant intervals. Further, for a method of searching a moving picture stored in a computer, a technique is known in which a plurality of still pictures included in a moving picture are simultaneously displayed on a monitor screen at predetermined constant time intervals.

When the variable-speed display is used, only a moving picture at one time point can be displayed at a time in a picture search operation, thereby requiring a certain time for picture search. A moving picture in which the content of a long moving picture requires a certain time for checking the content of the summary picture. In addition, a picture desired by a user is not always included in that summary picture.

If the method of reproducing and displaying a moving picture from a given position at certain intervals is used, checking the content of the reproduced picture takes time and a desired picture is not always included in a selected channel. The method of displaying a still picture included in a moving picture at certain time intervals requires to display many pictures; in this case, a desired picture is not always included in that still picture.

SUMMARY OF THE INVENTION

Thus, the known methods do not allow a user to check, at desired time intervals and in a desired quantity, the still pictures at given point of time, included in a moving picture to be searched, thereby makes it significantly difficult for the user to quickly search and use the content of moving pictures.

It is therefore an object of the present invention to provide an image processing apparatus, an image processing method, and an information providing medium that allow a user to check, at desired time intervals and in a desired quantity, still pictures at desired points of time, included in a moving picture to be searched.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

In order to clarify the correlation between the means of the invention described in the claims appended hereto and the components of the embodiment of the invention, each of the means is followed by parentheses in which an example of the corresponding component of the embodiment is enclosed. It should be noted however that each of the above means are not restricted to those described below.

Namely, an image processing apparatus as cited in claim 1 appended hereto comprises an input means (for example, a mouse 17 shown in FIG. 1) for inputting the start and end points of an image to be displayed, a thumbnail generating means (for example, a CPU 11 shown in FIG. 1) for generating a still picture (for example, a thumbnail) of a moving picture between the start and end points inputted by the input means at predetermined time intervals, and a display control means (for example, the CPU 11 shown in FIG. 1) for simultaneously displaying the predetermined number of thumbnails sequentially in time.

Figure 1:
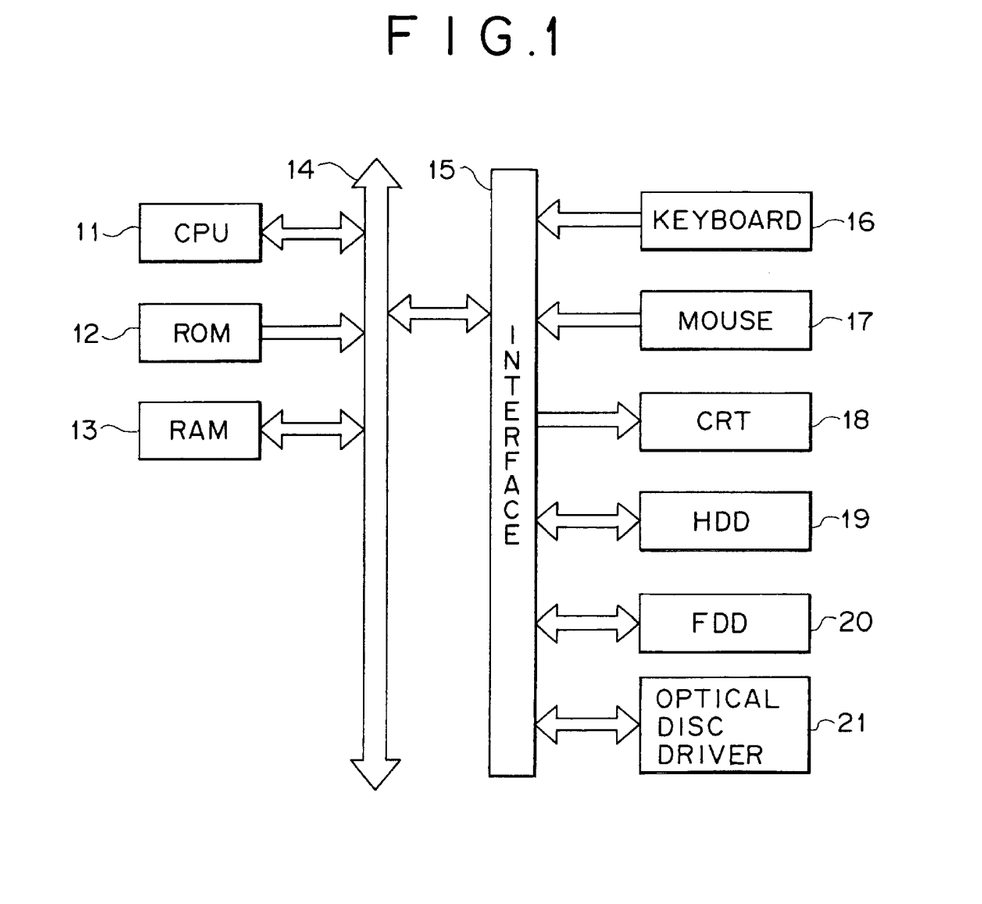
FIG. 1 is a block diagram illustrating a configuration of a personal computer practiced as a preferred embodiment of the invention.

Now, referring to FIG. 1, the CPU (Central Processing Unit) 11 executes an image processing application program and an OS (Operating System). A ROM (Read Only Memory) 12 stores basically fixed data among programs and computation parameters for use by the CPU 11. A RAM (Random Access Memory) 13 stores programs to be used by the CPU 11 for execution and parameters which change from time to time in the execution. These components are interconnected by a bus 14.

A keyboard 16 is operated by a user to input a variety of commands into the CPU 11. A mouse 17 is operated by the user to specify or select a point on the screen of a CRT (Cathode Ray Tube) 18. The CRT 18 displays pictures and a variety of information in text or image. A HDD (Hard Disk Drive) 19 and an FDD (Floppy Disk Drive) 20 drive a hard disc and a floppy disc respectively on which programs to be executed by the CPU 11 and information are stored or reproduced. An optical disc driver 21 is loaded with an optical disc on which moving pictures are stored. These components are connected to an interface 15 which is connected to the CPU 11 through the bus 14.

Figure 2:
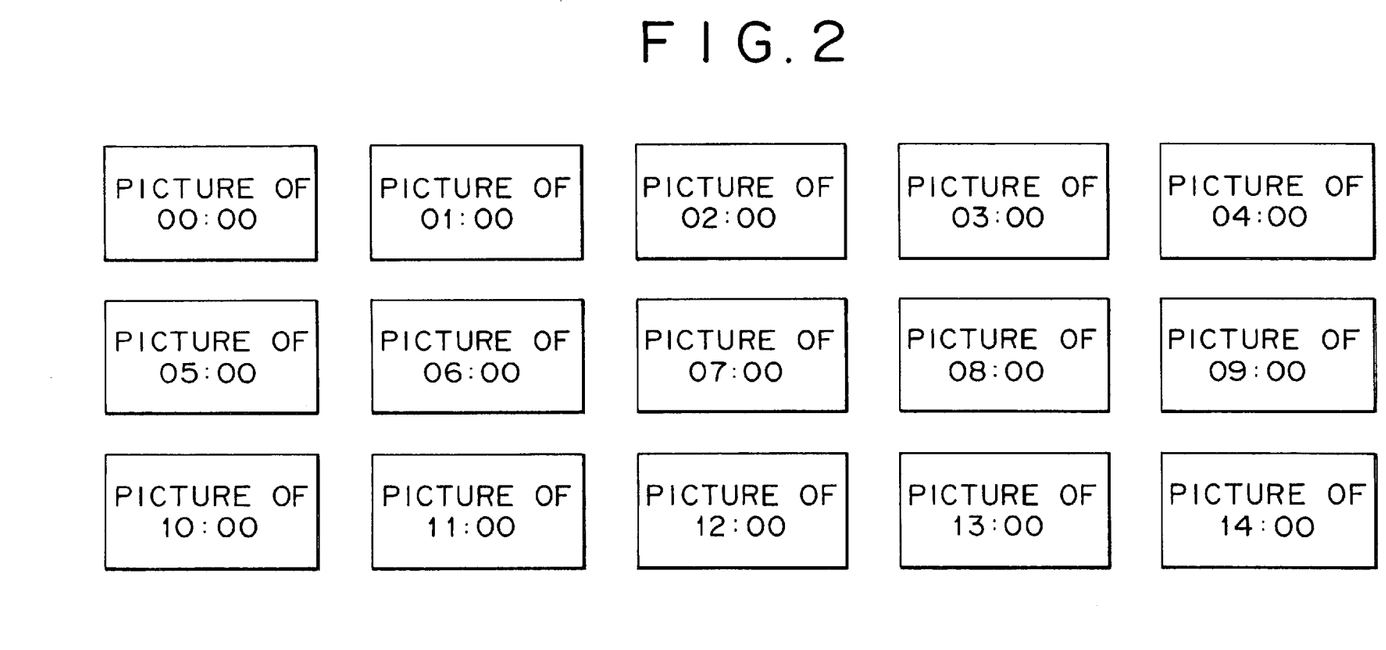
FIG. 2 is a diagram illustrating screens for searching moving pictures.

The following describes the screens to be displayed when a moving picture is searched by use of the personal computer practiced as one preferred embodiment with reference to FIG. 2. FIG. 2 shows 15 picture thumbnails created from still pictures at intervals of one minute of a moving picture having a duration of 15 minutes, these picture thumbnails being simultaneously displayed on the CRT 18. Namely, the picture thumbnail located at the upper leftmost of the diagram indicates the first picture of the moving picture (namely, the picture obtained at location which is zero minute zero second after the start picture (origin) of the moving picture). The second picture thumbnail, next to the first picture on top row, indicates a picture obtained one minute zero second after the origin. Thus, each thumbnail on top row indicates a picture obtained one minute zero second after the thumbnail immediately on the left side. Therefore, the five picture thumbnails on top row indicate the pictures obtained four minutes zero second in total after the first or origin picture of the moving picture.

The picture thumbnail located at the leftmost of middle row indicates a picture obtained one minute zero second after the picture thumbnail located at the rightmost of top row. Namely, the middle left thumbnail indicates a picture obtained five minutes zero second after the origin. Each picture thumbnail on middle row also indicates a picture obtained one minute zero second after the picture thumbnail immediately on the left side. Therefore, the five picture thumbnails on middle row range from the picture obtained five minutes zero second after the origin to the picture nine minutes zero second after the origin.

The picture thumbnail located at the leftmost of bottom row indicates a picture obtained one minute zero second after the picture thumbnail located at the rightmost of middle row, namely the picture obtained 10 minutes zero second after the origin. Each picture thumbnail on bottom row also indicates a picture obtained one minute zero second after the immediately left-side picture. Therefore, the five picture thumbnails on bottom row range from the picture obtained 10 minutes zero second after the origin to the picture obtained 14 minutes zero second after the origin.

Thus, the CRT 18 simultaneously displays all the picture thumbnails obtained at intervals of one minute of the moving picture. Obviously, the number of picture thumbnails need not be limited to 15. As long as the content is identifiable, the CRT 18 can display any number of picture thumbnails in one screen or the CRT 18 can change the picture thumbnails to be displayed by scrolling. In addition, in the above-mentioned example, the pictures obtained every one minute are used. The time interval, however, may be altered to 10 minutes or one second for example as required.

Figure 3:
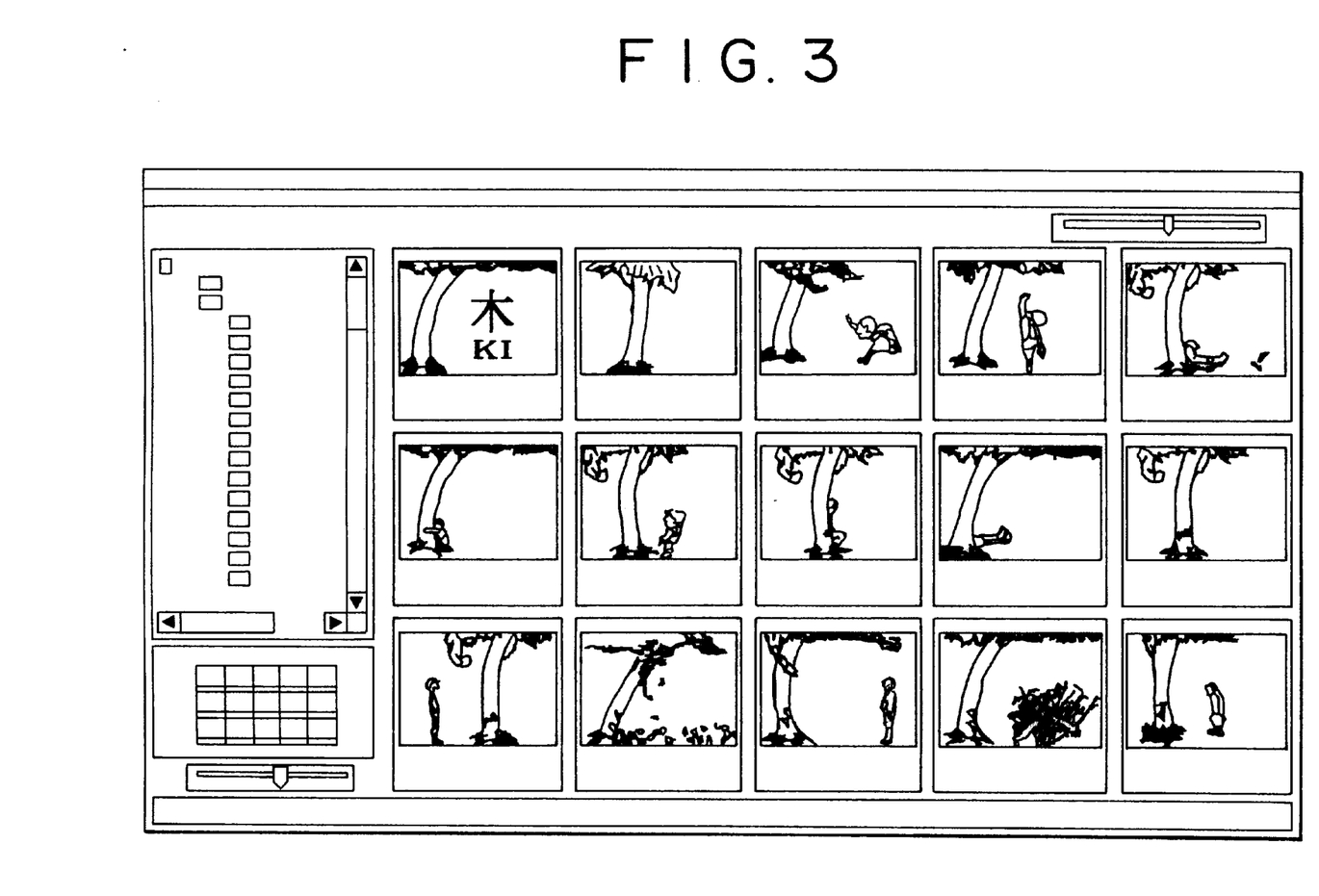
FIG. 3 is a diagram illustrating images in more detail than those of FIG. 2.

FIG. 3 shows picture thumbnails in more detail than those shown in FIG. 2. The CRT 18 displays various buttons necessary for a picture thumbnail operation and the predetermined number of picture thumbnails sequentially arranged in time.

Figure 4:
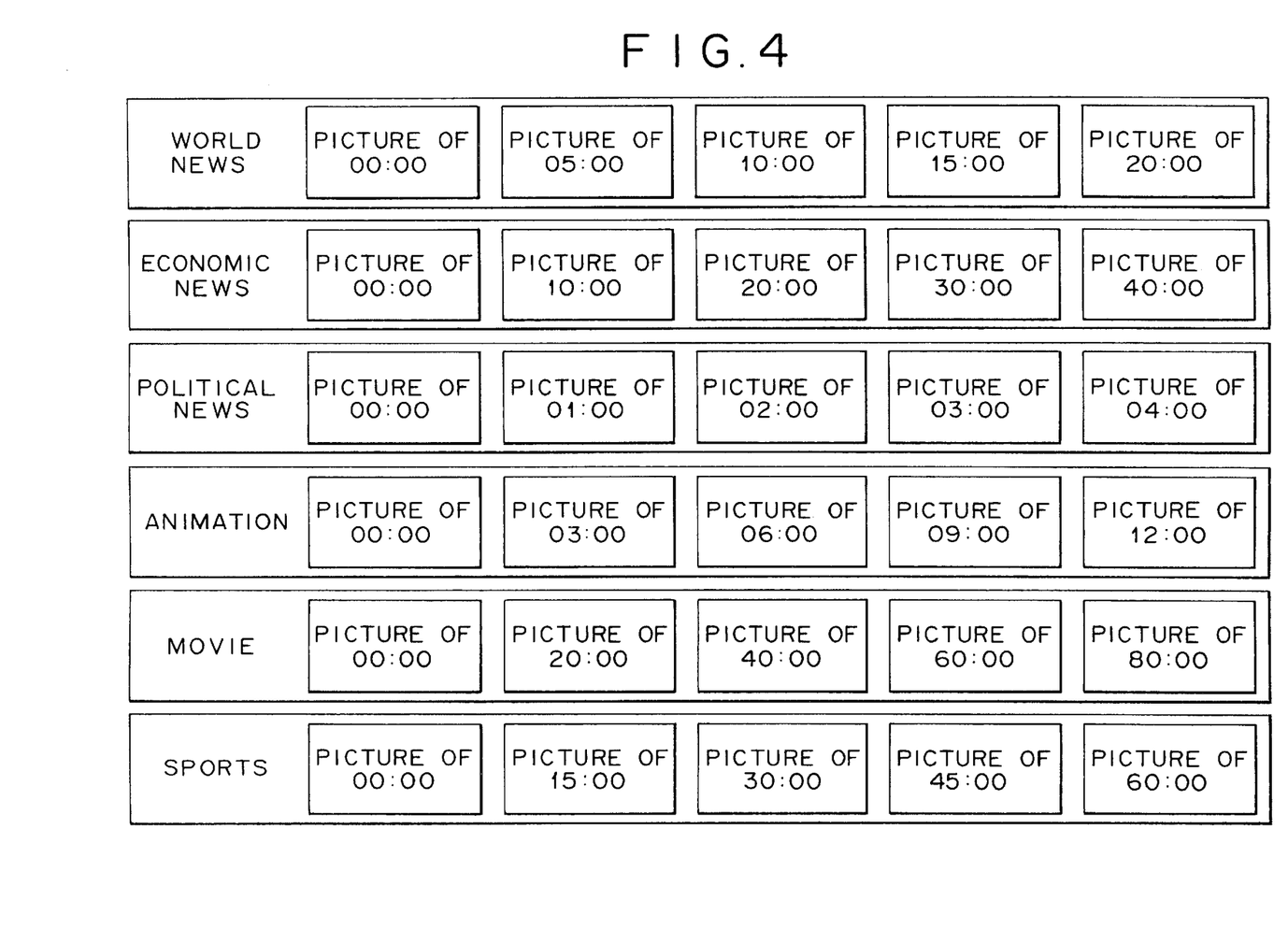
FIG. 4 is a diagram illustrating other screens for searching moving pictures.

The following describes another screen example for moving picture search by use of the personal computer associated with the present invention, with reference to FIG. 4. FIG. 4 shows the CRT 18 simultaneously displaying the picture thumbnails of six moving pictures. On top row, there are five picture thumbnails in total at time intervals of five minutes of the world news moving picture. On the second row from top, there are five picture thumbnails in total at intervals of 10 minutes of the economic news moving picture. On the third row, there are five pictures in total at internals of one minute of the political news moving picture.

On the fourth row, there are five picture thumbnails in total at intervals of three minutes of the animation moving picture. On the fifth row, there are five picture thumbnails at intervals of 20 minutes of the movie moving picture. On the sixth or bottom row, there are five picture thumbnails at intervals of 15 minutes of the sports moving picture.

Thus, the CRT 18 simultaneously displays the picture thumbnails at predetermined intervals of each of the plural moving pictures.

Figure 5:
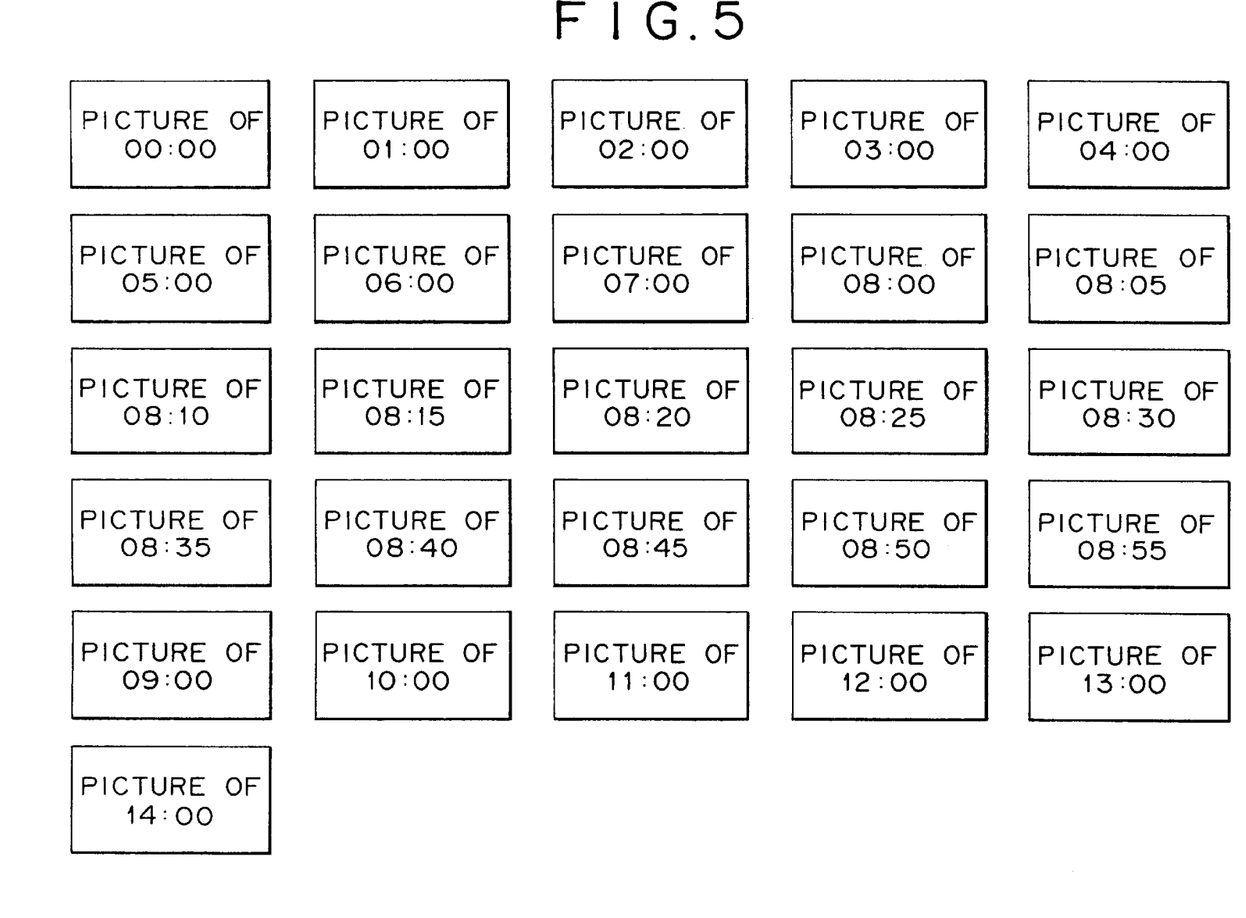
FIG. 5 is a diagram illustrating screens for displaying pictures by inserting picture thumbnails of still smaller time intervals.

FIG. 5 shows a state in which picture thumbnails at smaller time intervals than those shown in FIG. 2 are inserted. Namely, between the picture thumbnail indicative of the picture obtained eight minutes zero second after the origin and the picture thumbnail indicative of the picture obtained nine minutes zero second after the origin, 11 picture thumbnails at time intervals of five seconds are displayed.

Thus, picture thumbnails of shorter time intervals may be inserted, at desired time, below the top row of predetermined picture thumbnails.

Figure 6:
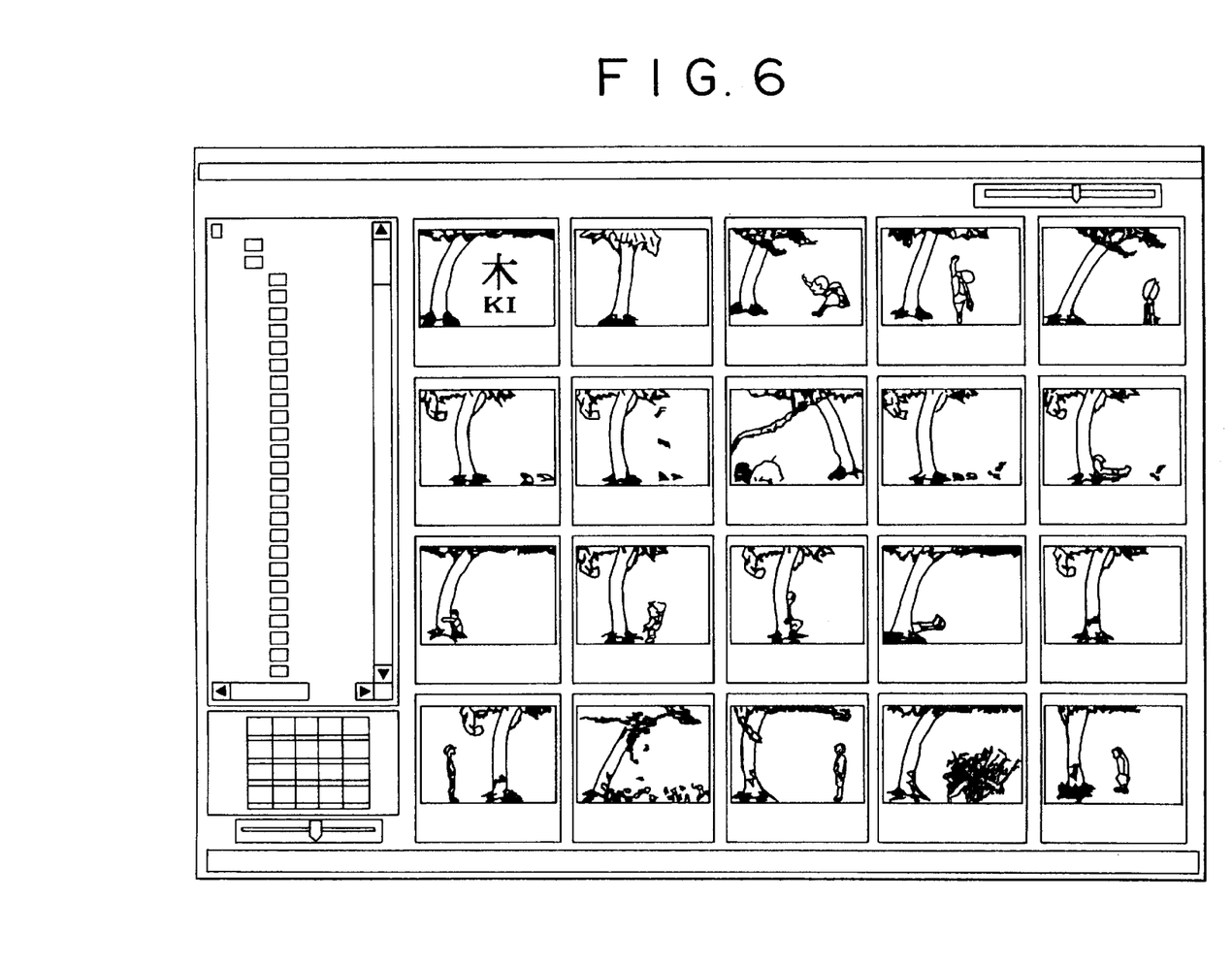
FIG. 6 is a diagram illustrating the display of FIG. 5 in more detail.

FIG. 6 illustrates an image in more detail than that shown in FIG. 5. In the image of FIG. 6, predetermined picture thumbnails are inserted in the display shown in FIG. 3.

Figure 7:
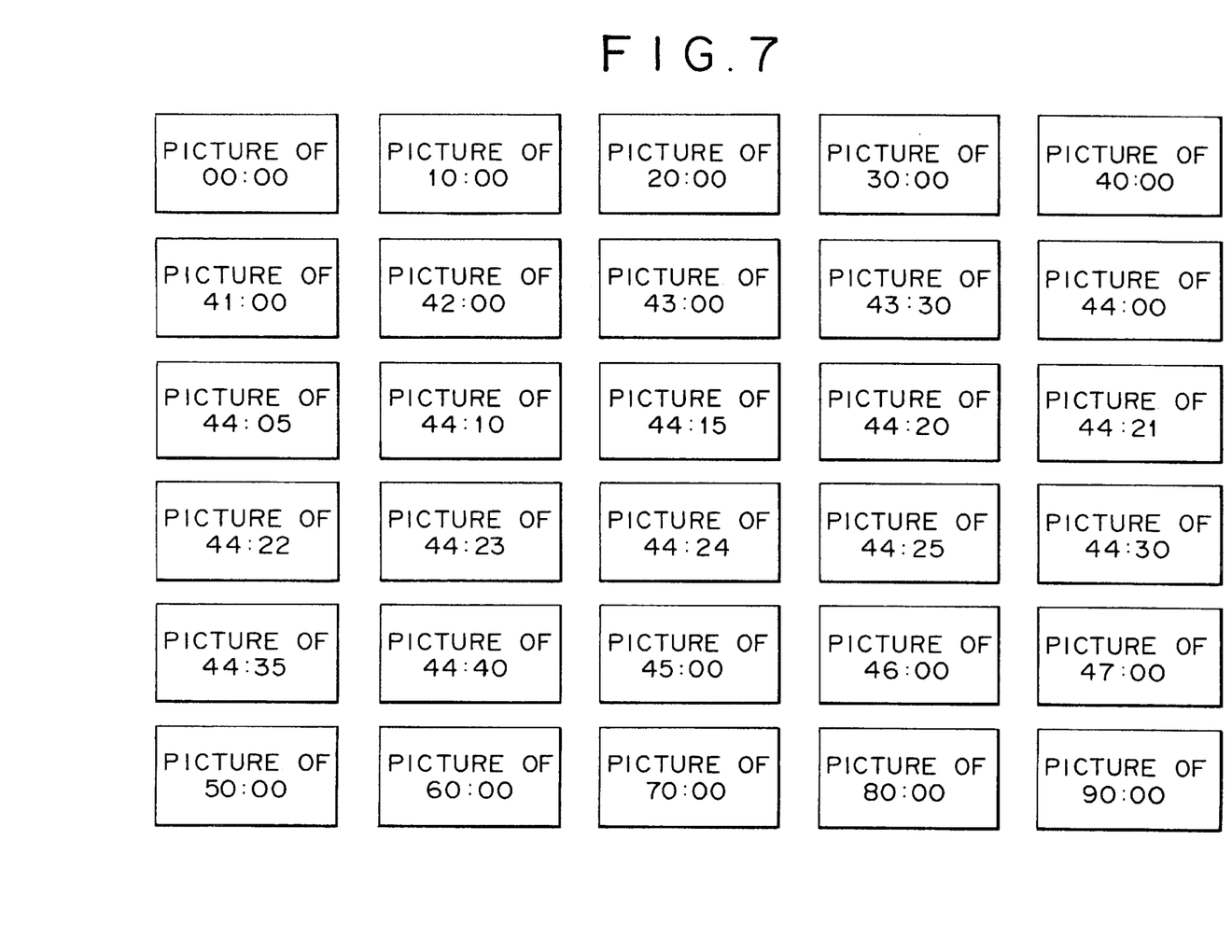
FIG. 7 is a diagram illustrating an example of screens obtained by repeating picture thumbnails of shorter time intervals.

FIG. 7 shows an example in which the insertion of picture thumbnails of shorter time intervals described with reference to FIG. 5 is repeated. As shown, the display of picture thumbnails obtained at intervals of 10 minutes from a moving picture having a duration of 100 minutes is inserted with seven picture thumbnails at intervals of one minute with the origin 40 minutes zero second passed from the reproduction of the moving picture (namely, a picture 41 minutes zero second after the origin, a picture 42 minutes zero second after, a picture 43 minutes zero second after, a picture 44 minutes zero second after, a picture 45 minutes zero second after, a picture 46 minutes zero second after, and a picture 47 minutes zero second after).

Then, a picture thumbnail indicative of a picture 43 minutes 30 seconds passed from the origin follows the image 43 minutes zero second passed from the reproduction of the moving picture.

Further, with the image 44 minutes zero second passed from the reproduction of the moving picture being used as the origin, eight picture thumbnails at intervals of 5 seconds are inserted (namely, a picture 44 minutes 5 second after the origin, a picture 44 minutes 10 seconds after, a picture 44 minutes 15 seconds after, a picture 44 minutes 20 seconds after, a picture 44 minutes 25 seconds after, a picture 44 minutes 30 seconds after, a picture 44 minutes 35 seconds after, and a picture 44 minutes 40 seconds after).

Lastly, with a picture 44 minutes 20 seconds passed from the reproduction of the moving picture being used as the origin, four picture thumbnails at intervals of one second are inserted (namely, a picture 44 minutes 21 seconds after the origin, a picture 44 minutes 22 seconds after, a picture 44 minutes 23 seconds after, and a picture 44 minutes 24 seconds after).

Thus, narrowing the picture display time intervals allows the user operating the personal computer to quickly search the middle row of a long moving picture for desired pictures.

Figure 8:
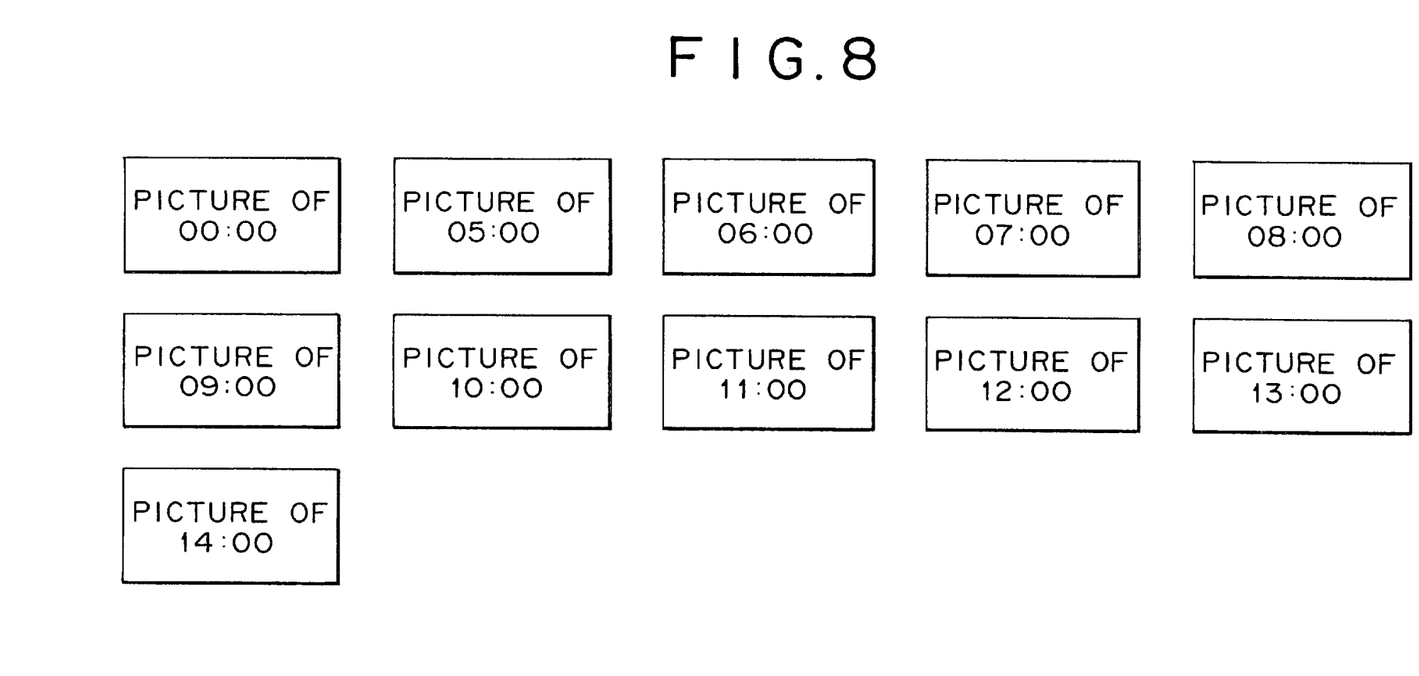
FIG. 8 is a diagram illustrating screens obtained by deleting unnecessary image thumbnails.

The picture thumbnails not required for picture search can be deleted as shown in FIG. 8. Namely, as shown in FIG. 8, the picture thumbnails starting with the picture thumbnail one minute zero second passed from the origin and ending with the picture thumbnail 4 minutes zero second passed from the origin are deleted from the state shown in FIG. 2.

Figure 9:
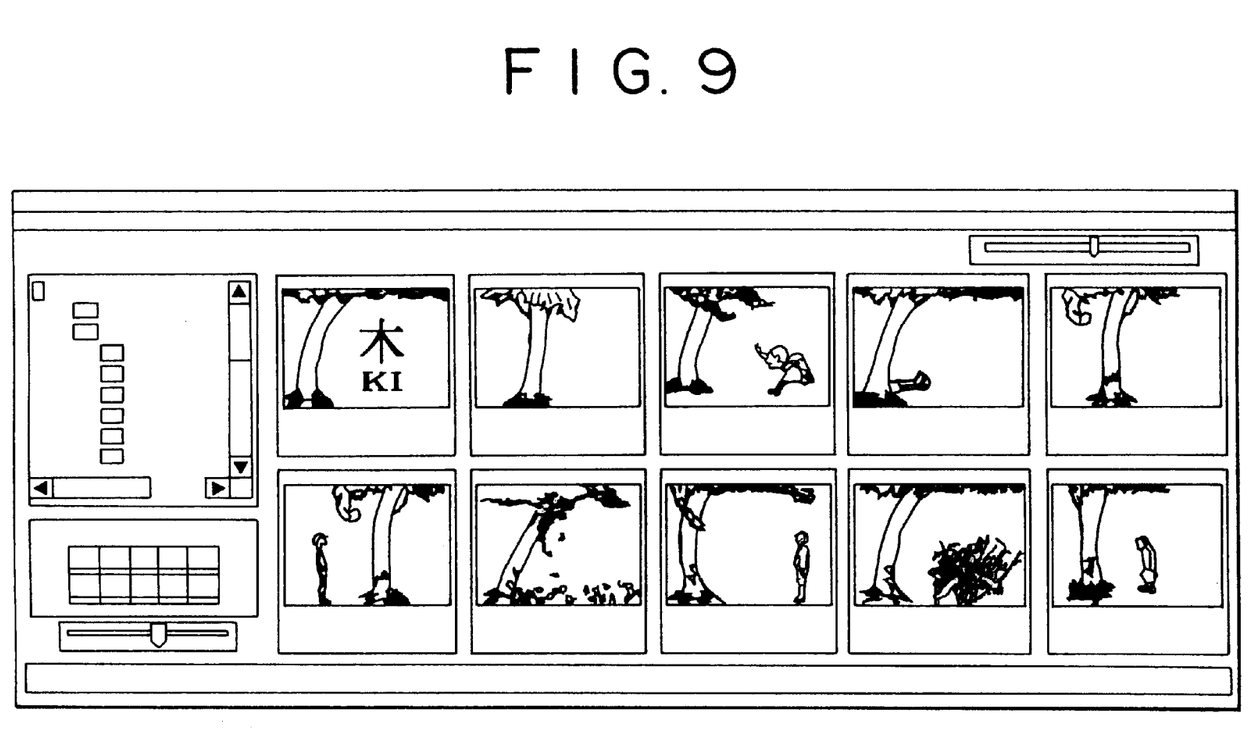
FIG. 9 is a diagram illustrating the images of FIG. 8 in more detail.

FIG. 9 shows an image in more detail than that of FIG. 8. Compared with the example shown in FIG. 3, the example of FIG. 8 is smaller in the number of displayed picture thumbnails.

Figure 10:
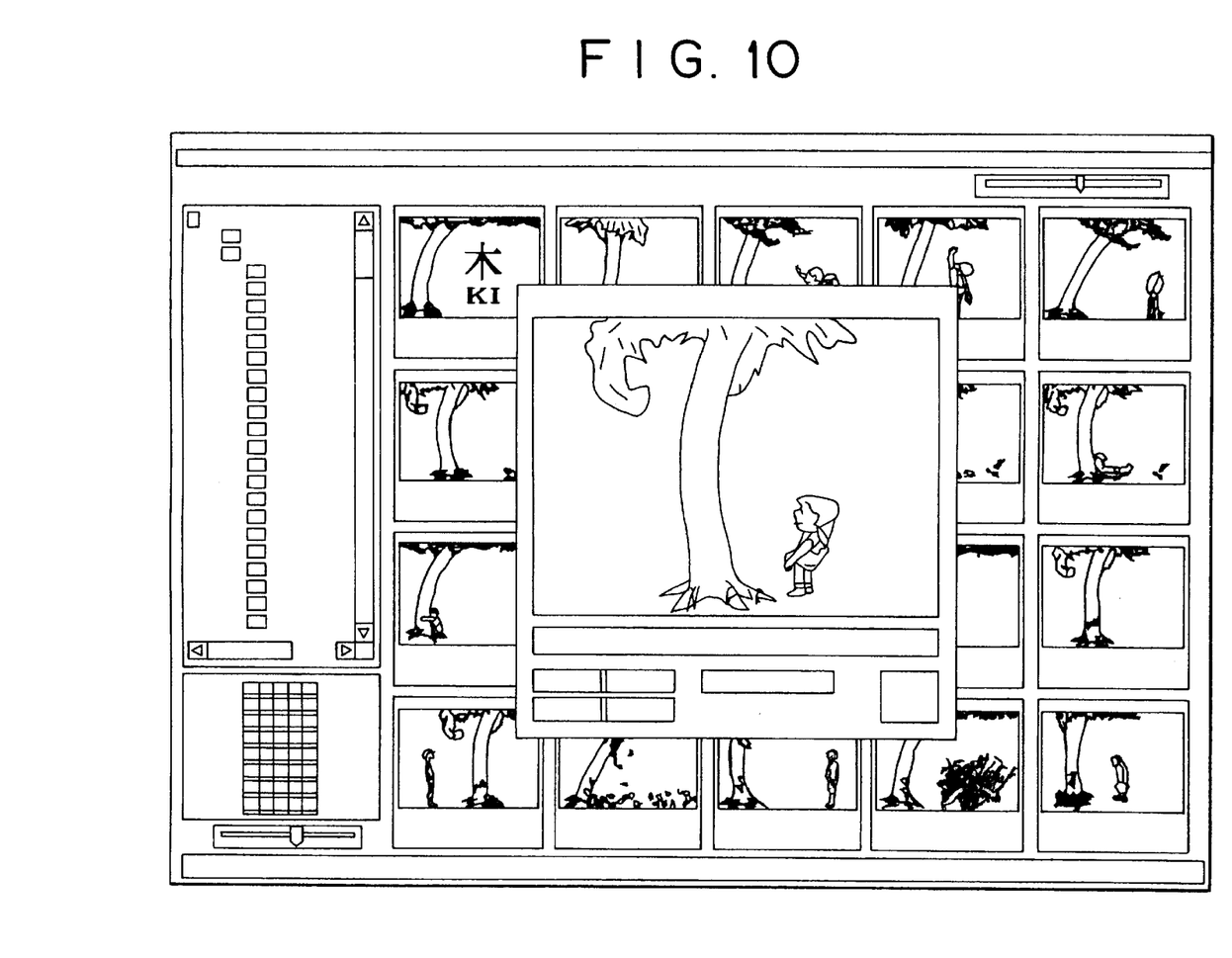
FIG. 10 is a diagram illustrating an example of reproducing a moving picture by specifying a searched picture thumbnail.

FIG. 10 shows a screen example in which a searched picture thumbnail is specified to reproduce the moving picture. As shown, a moving picture display window is opened on top of picture thumbnails. In the upper portion of the window, the moving picture is displayed that starts from the picture indicated by the specified picture thumbnail. Two picture thumbnails may be specified to reproduce the moving picture in between.

Figure 11:
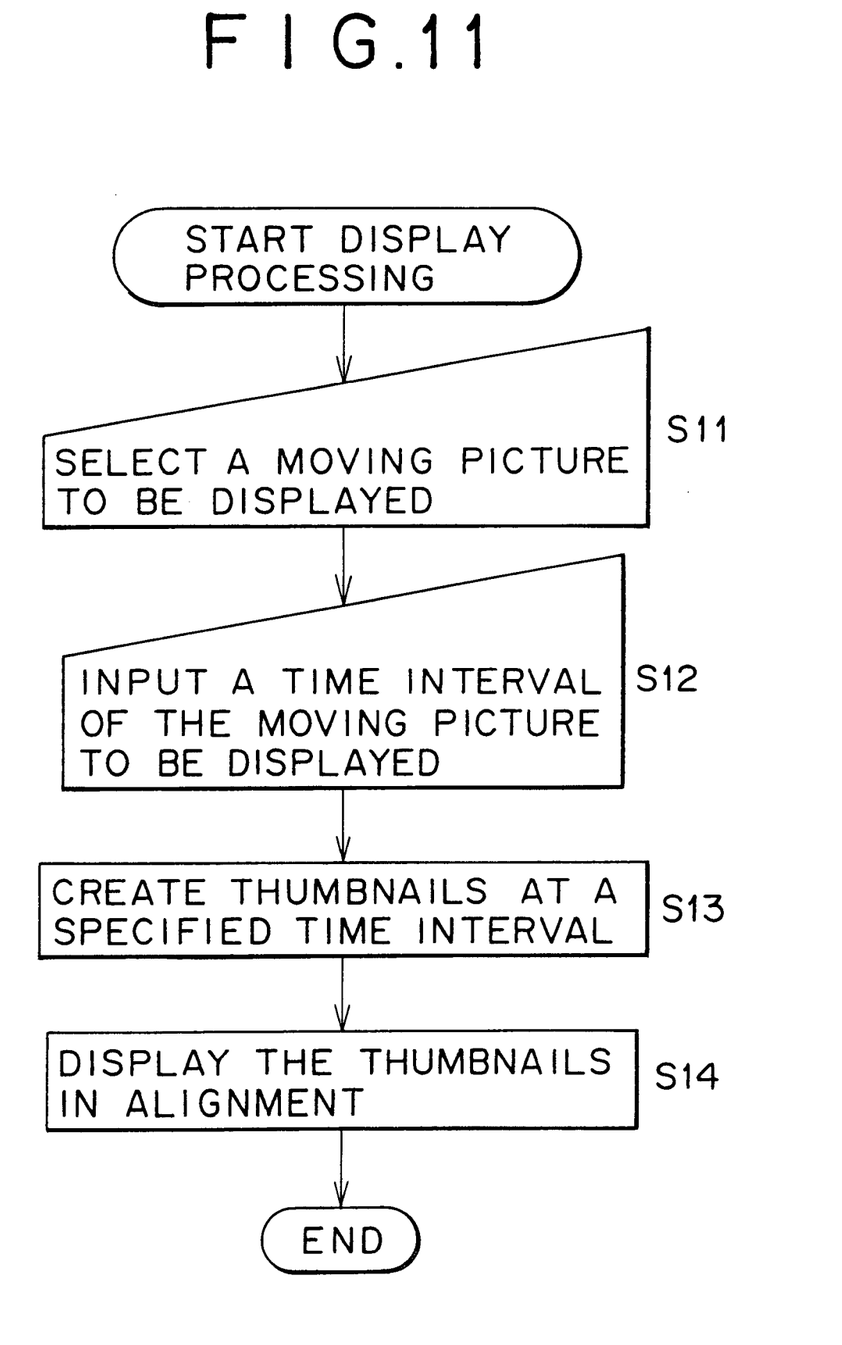
FIG. 11 is a flowchart for describing the display processing.

The following describes the above-mentioned display processing with reference to the flowchart shown in FIG. 11. In step S11, the user operates the keyboard 16 or the mouse 17 to select a desired moving picture from among those stored on the optical disc loaded in the optical disc driver 21. In step S12, the user operates the keyboard 16 or the mouse 17 to input the time intervals for the pictures to be displayed.

In step S13, the CPU 11 creates the picture thumbnails of the selected moving picture at the time interval inputted in step S12. In step S14, the CPU 11 displays the picture thumbnails created in step S13 onto the CRT 18 in a time-sequentially arranged manner, upon which the processing comes to an end.

Thus, the CRT 18 of the personal computer simultaneously displays the picture thumbnails of the moving picture at the predetermined intervals as arranged in a time sequential manner.

Figure 12:
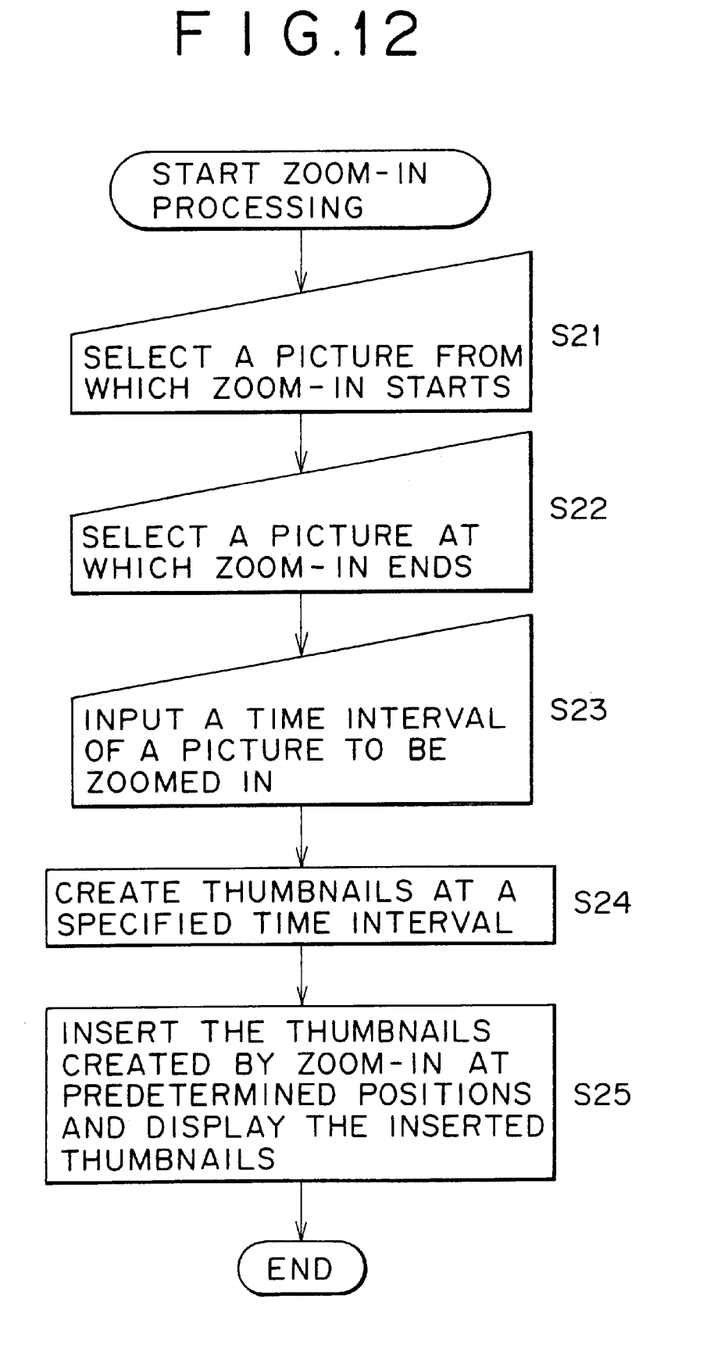
FIG. 12 is a flowchart for describing zoom-in processing for inserting picture thumbnails with picture time interval narrowed.

The following describes zoom-in processing for displaying picture thumbnails with the picture time interval narrowed, with reference to the flowchart shown in FIG. 12. In step S21, the user operates the keyboard 16 or the mouse 17 to select a picture thumbnail from which zoom-in processing will start. In step S22, the user operates the keyboard 16 or the mouse 17 to select a picture thumbnail at which the zoom-in processing will end. In step S23, the user operates the keyboard 16 or the mouse 17 to set zoom-in time intervals.

In step S24, the CPU 11 creates picture thumbnails of the picture between the picture thumbnails specified in steps S21 and S22, at the time intervals inputted in step S23. In step S25, the CPU 11 inserts the picture thumbnails created in step S24 between the original thumbnails in a time sequential manner and displays this state onto the CRT 18. At this moment, the picture thumbnails located backward in time are sequentially shifted backward.

Thus, the picture thumbnails with time interval narrowed inserted between desired pictures can be displayed.

Figure 13:
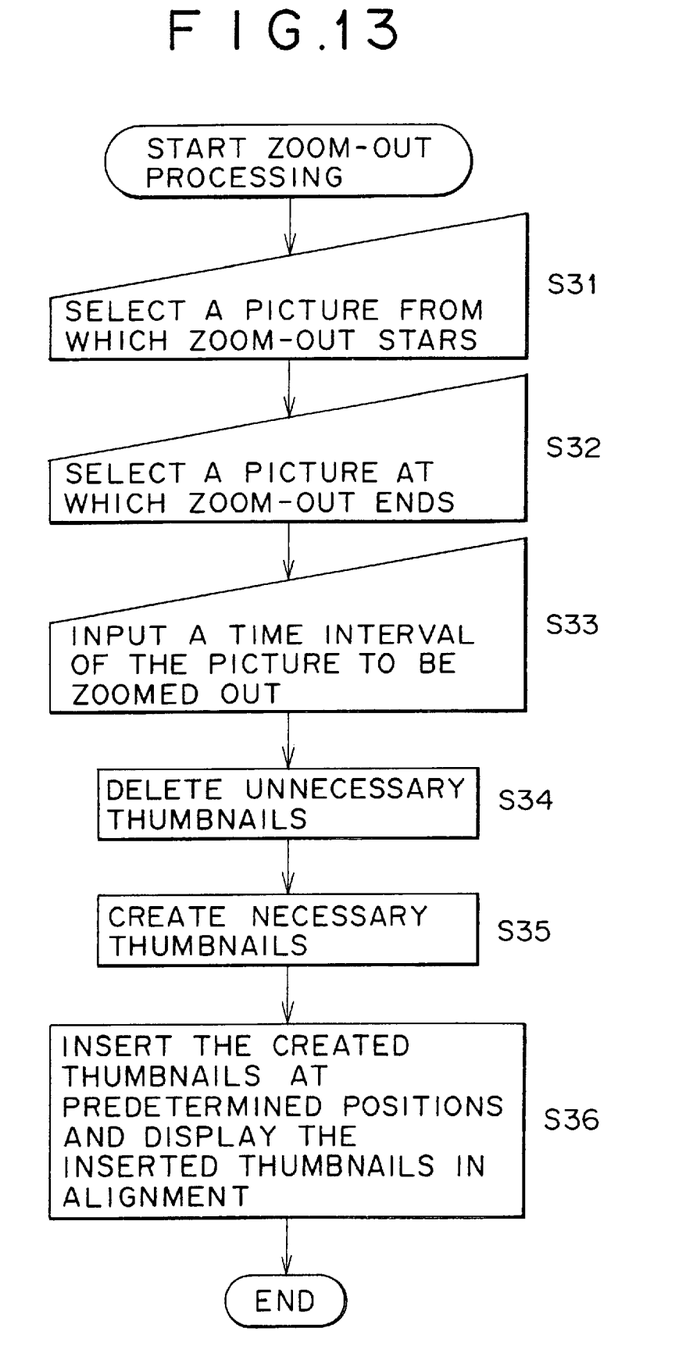
FIG. 13 is a flowchart for describing zoom-out processing for expanding picture time intervals and deleting and inserting predetermined picture thumbnails.

The following describes zoom-out processing for increasing a picture time interval and deleting and inserting desired thumbnails, with reference to the flowchart shown in FIG. 13. In step S31, the user operates the keyboard 16 or the mouse 17 to select a picture thumbnail from which zoom-out processing will start. In step S32, the user operates the keyboard 16 or the mouse 17 to select a thumbnail at which the zoom-out processing will end. In step S33, the user operates the keyboard 16 or the mouse 17 to set zoom-out time intervals.

In step S34, the CPU 11 deletes unnecessary picture thumbnails of the picture between the picture thumbnails specified in steps S31 and S32, at the time intervals inputted in step S33. In step S35, the CPU 11 creates the picture thumbnails of the picture between the picture thumbnails specified in step S31 and S32, at the time intervals inputted in step S33. In step S36, the CPU 11 inserts the picture thumbnails created in step S35 between the original picture thumbnails in a time sequential manner and displays this state on the CRT 18. At this moment, the picture thumbnails arranged backward in time are sequentially shifted forward.

Thus, the picture thumbnails with time interval expanded between desired pictures can be displayed.

In the above-mentioned example, time intervals are inputted by the user. It will be apparent that preset time intervals may be used. In this case, the picture thumbnails may be displayed between the start point and end point specified by the user at the preset intervals. In this case, one of zoom-in mode or zoom-out mode is selected in advance.

In the above-mentioned example, the size of picture thumbnails is preset and the maximum number of picture thumbnails to be displayed on the CRT 18 is constant. It will be apparent that the size may be variable with the number of picture thumbnails to be displayed (namely, the size is smaller as the number of picture thumbnails is large and vice versa). Also, the number of picture thumbnails to be displayed on the CRT 18 may be specified by the user and the size of the picture thumbnails may be varied accordingly.

Thus, with the personal computer associated with the invention, necessary picture thumbnails at a plurality of desired time points of a moving picture are simultaneously displayed at desired time intervals. This novel constitution allows the user to quickly search desired pictures.

Further, the user may specify a plurality of selected picture thumbnails not only to perform moving picture reproduction but also open a moving picture editing window on top of the screen for moving picture cutout, copy, and paste operations.

It should be noted that a medium for providing the user with the computer programs for executing the above-mentioned processing includes not only recording media such as magnetic disc, CD-ROM, and solid memory but also communication media such as network and communication satellite.

As described and according to the image processing apparatus cited in claim 1 appended hereto, the image processing method cited in claim 5 appended hereto, and the information providing medium cited in claim 9 appended hereto, the start and end points of a picture to be displayed are inputted by the user, the picture thumbnails between the inputted start and end points are generated at predetermined time intervals, and the predetermined number of thumbnails are simultaneously displayed as arranged in a time sequential manner. This novel constitution allows the user to check the pictures of a moving picture to be searched at desired points of time and desired time intervals and in a desired quantity.

While the preferred embodiments of the present invention have been described using specific terms, such description is for illustrative purposes only, and it is to be understood that changes and variations may be made without departing from the spirit or scope of the appended claims.

What is claimed is:

1. The image processing apparatus for displaying a still picture sequence constituting a series of moving pictures along an elapsed time of said still picture sequence, comprising:

a range specification means for specifying a desired range of said series of moving pictures;

a still picture generating means for forming a still picture sequence at a predetermined elapsed time from among the moving pictures in the range specified by said range specification means; and a display means for displaying said still picture sequence generated by said still picture generating means along said elapsed time, wherein said predetermined elapsed time is calculated from the number of still pictures that can be displayed at a predetermined display location.

2. The image processing apparatus as claimed in claim 1, further comprising:

a time interval setting means for setting said predetermined elapsed time.

3. The image processing method, for displaying a still picture sequence constituting a series of moving pictures along an elapsed time of said still picture sequence, comprising the steps of:

specifying a desired range of said series of moving pictures;

forming a still picture sequence at a predetermined elapsed time from among the moving pictures in the range specified in the range specification step; and displaying said still picture sequence generated in the still picture generating step along said elapsed time, wherein said predetermined elapsed time is calculated from the number of still pictures that can be displayed at a predetermined display location.

4. The image processing method as claimed in claim 3, further comprising the step of:

setting said predetermined elapsed time.

5. The information providing medium, for providing a computer program for displaying a still picture sequence constituting a series of moving pictures along an elapsed time of said still picture sequence, said computer program comprising the steps of:

specifying a desired range of said series of moving pictures;

forming a still picture sequence at a predetermined elapsed time from among the moving pictures in the range specified in the range specification step; and displaying said still picture sequence generated in the still picture generating step along said elapsed time, wherein said predetermined elapsed time is calculated from the number of still pictures that can be displayed at a predetermined display location.

6. The information providing medium as claimed in claim 5, wherein said computer program further comprising the step of:

setting said predetermined elapsed time.

* * * * *